(12) United States Patent
Pikarski et al.

(10) Patent No.: US 10,766,079 B2
(45) Date of Patent: Sep. 8, 2020

(54) DRILL BIT HOLDING ASSEMBLY FOR JIG AND JIG APPARATUS INCLUDING THE SAME

(71) Applicant: Power Box AG, Zug (CH)

(72) Inventors: Daniel Pikarski, Somerset (GB); Darrell Morris, Somerset (GB); Michael Corcoran, Northumberland (GB); Adam Yates, Northumberland (GB); Simon Bird, Somerset (GB)

(73) Assignee: Power Box AG, Zug (CH)

( * ) Notice: Subject to any disclaimer, the term of this patent is extended or adjusted under 35 U.S.C. 154(b) by 0 days.

(21) Appl. No.: 16/102,930

(22) Filed: Aug. 14, 2018

(65) Prior Publication Data

US 2019/0047058 A1 Feb. 14, 2019

(30) Foreign Application Priority Data

Aug. 14, 2017 (GB) .................................. 1712991.7
Aug. 14, 2017 (GB) .................................. 1712994.1

(51) Int. Cl.
*B23B 47/28* (2006.01)
*B23B 49/00* (2006.01)

(52) U.S. Cl.
CPC .......... *B23B 47/287* (2013.01); *B23B 49/005* (2013.01); *B23B 2231/0252* (2013.01);
(Continued)

(58) Field of Classification Search
CPC . B23B 47/287; B23B 49/005; B23B 2247/10; Y10T 408/567; Y10T 408/8925; Y10T 408/99; Y10S 408/71
See application file for complete search history.

(56) References Cited

U.S. PATENT DOCUMENTS 3,200,862 A * 8/1965 Heathington ......... B23B 47/287
144/27
3,534,639 A * 10/1970 Treichler ............. B25H 1/0078
408/112

(Continued)

FOREIGN PATENT DOCUMENTS

GB 840702 A * 7/1960 ........... B23B 49/005

*Primary Examiner* — Eric A. Gates
(74) *Attorney, Agent, or Firm* — Woodard, Emhardt, Henry, Reeves & Wagner, LLP

(57) ABSTRACT

The invention relates to a drill hold assembly and a jig including the same. The drill hold assembly includes an engaging means which is selectively moveable between a released position to allow sliding movement of the drill bit with respect thereto and an engaged position in which the drill bit is held in a fixed position or within a predefined range of movement with respect to the engaging block to thereby maintain the drill bit in location with the drill hold assembly. The jig apparatus can be used with a powered drill to rotate the drill bit to provide a driving force to the drill bit and the jig is attached to a support surface and a workpiece is positioned between first and second jaws of the jig and the drill bit is advanced along a guide and introduced into the workpiece to form a hole therein at a predefined angle. The drill bit can then be removed from the hole and the drill bit is held by the drill hold assembly to retain the drill bit in a fixed position with respect to the jig to thereby allow relative movement of the jig apparatus and workpiece whilst the drill bit is retained in position with the jig apparatus.

14 Claims, 12 Drawing Sheets

Figures 1C, 1D:
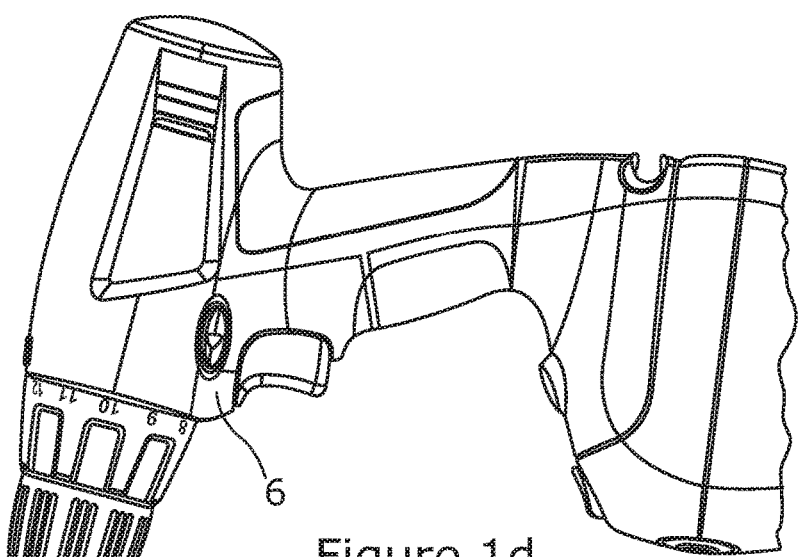

(52) U.S. Cl.
CPC ....... *B23B 2247/10* (2013.01); *B23B 2247/12* (2013.01); *B23B 2260/02* (2013.01); *Y10S 408/71* (2013.01); *Y10T 408/567* (2015.01); *Y10T 408/99* (2015.01)

(56) References Cited

U.S. PATENT DOCUMENTS

| | | | | |
|---|---|---|---|---|
| 4,039,266 | A * | 8/1977 | O'Connell | B23B 49/005 408/202 |
| 4,710,075 | A * | 12/1987 | Davison | A61B 17/16 33/512 |
| 4,865,496 | A * | 9/1989 | Challis | B23B 47/28 408/115 R |
| 4,955,766 | A * | 9/1990 | Sommerfeld | B23B 47/287 408/103 |
| 5,076,742 | A * | 12/1991 | Lee | B23B 47/287 408/112 |
| 6,543,971 | B2 * | 4/2003 | Mawhinney | B23B 49/005 408/139 |
| 6,637,988 | B1 * | 10/2003 | Park | B23B 47/287 408/103 |
| 7,641,425 | B2 * | 1/2010 | Sommerfeld | B23B 47/287 269/224 |
| 8,336,649 | B2 * | 12/2012 | Jones | E21B 10/55 175/413 |
| 8,840,345 | B1 * | 9/2014 | Park | B23B 47/287 408/103 |
| 9,180,529 | B1 * | 11/2015 | Harrison | B23B 51/0054 |
| 9,327,359 | B2 * | 5/2016 | Wotruba | B23G 5/06 |
| 9,782,837 | B2 * | 10/2017 | Pelkey | B23B 47/287 |
| 2007/0201961 | A1 * | 8/2007 | Chiang | B23B 47/287 408/115 R |

* cited by examiner

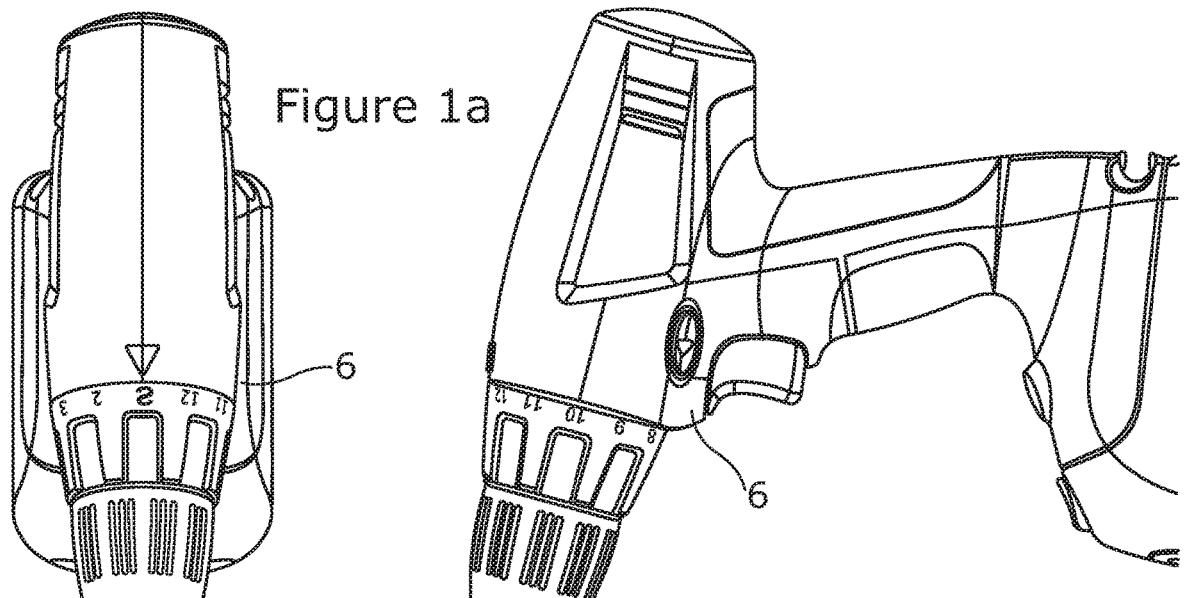
Figure 1a
Figure 1b
Open gate,
Insert drill
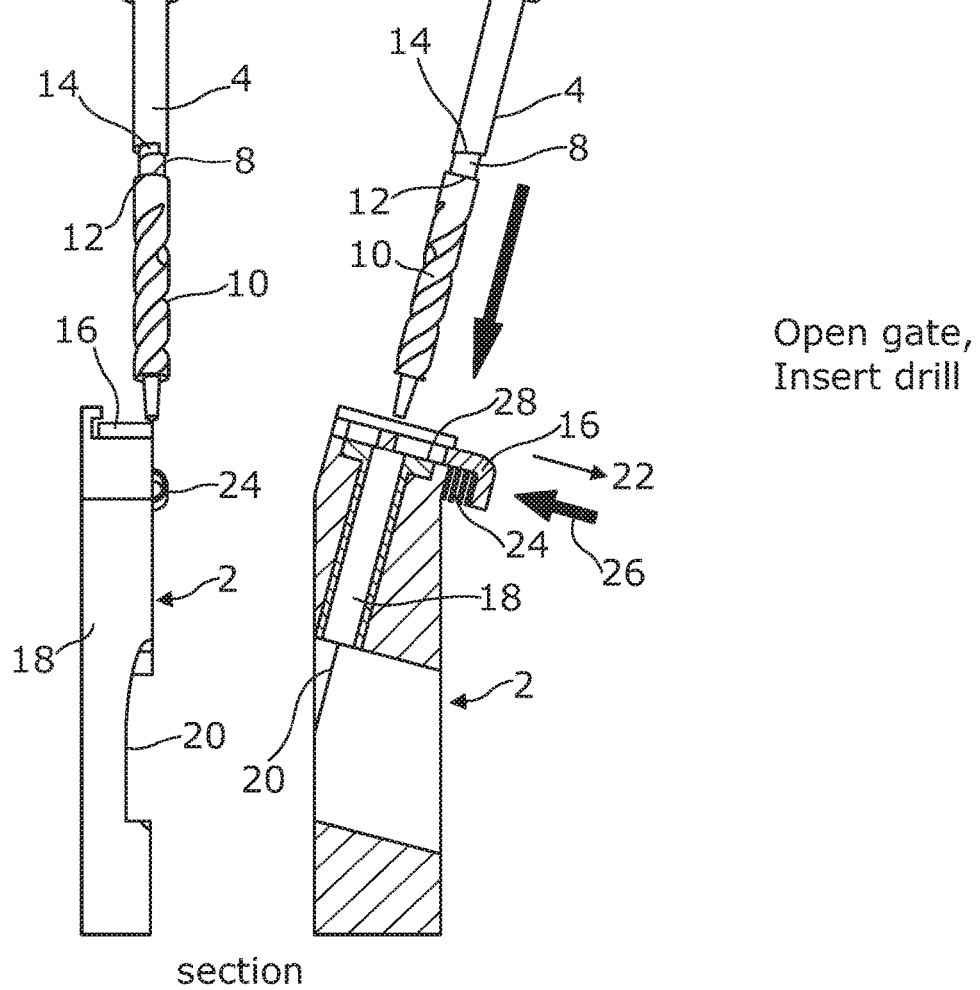
section

Gate secures drill section

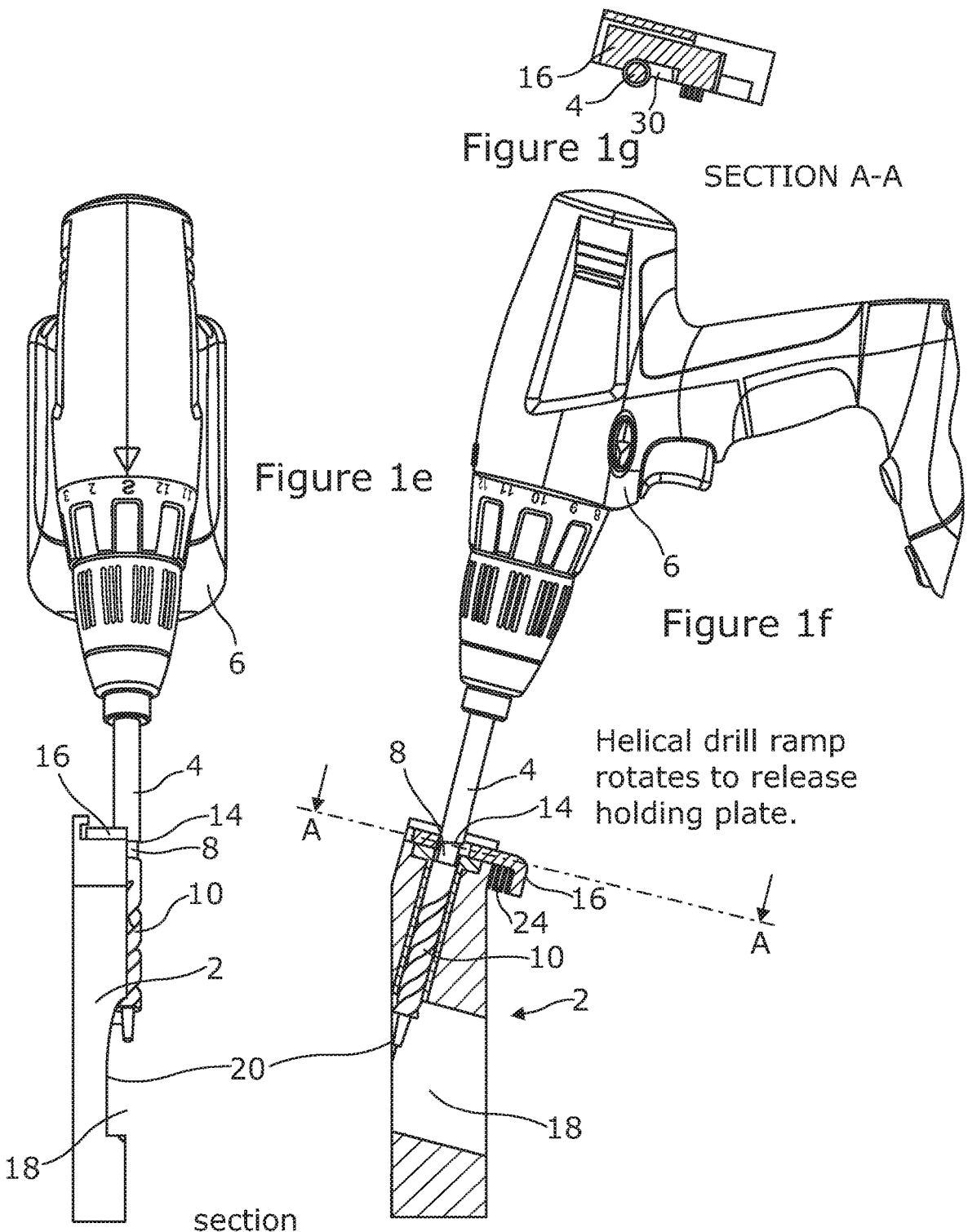

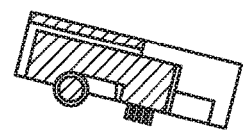
Figure 1j
SECTION A-A
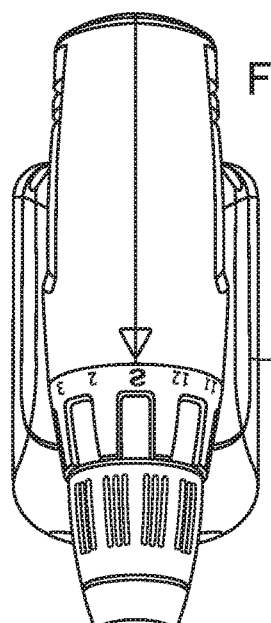
Figure 1h
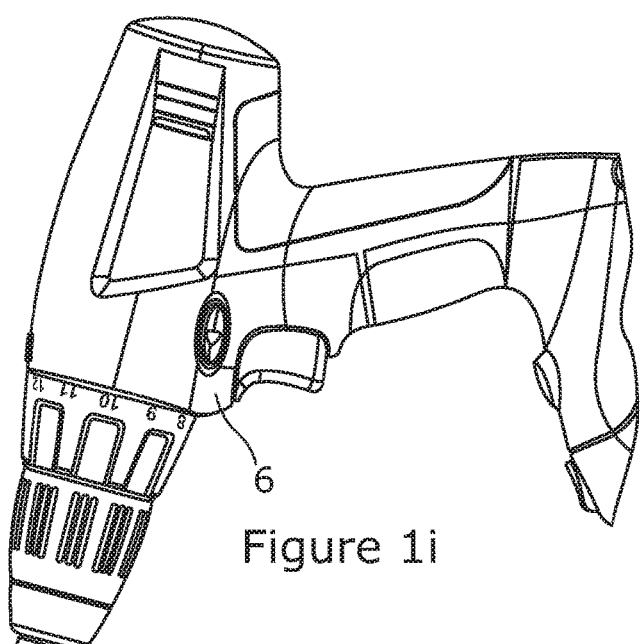
Figure 1i
Drill free to drop down to depth stop.
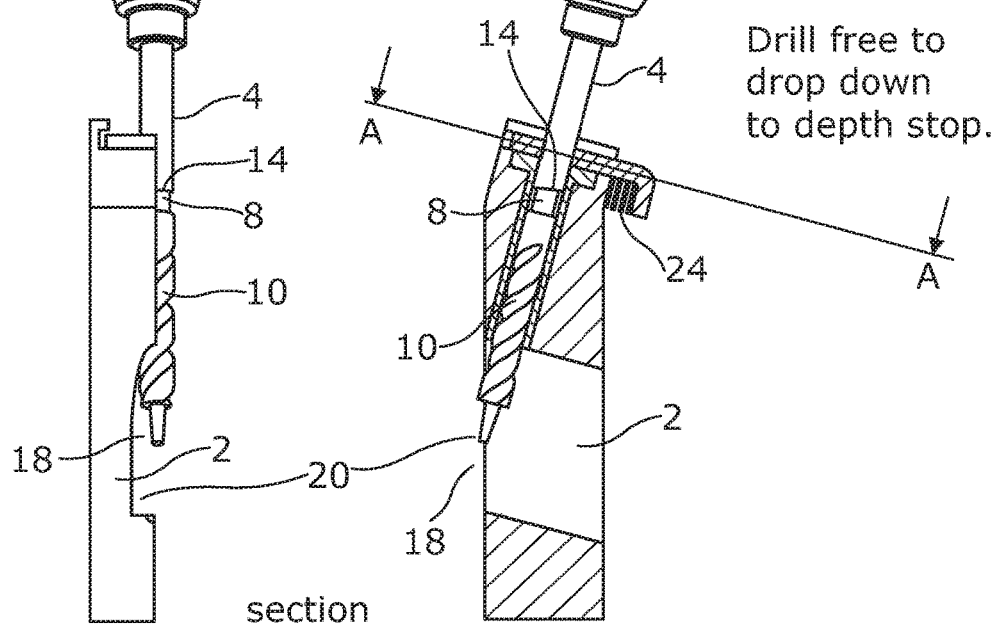
section

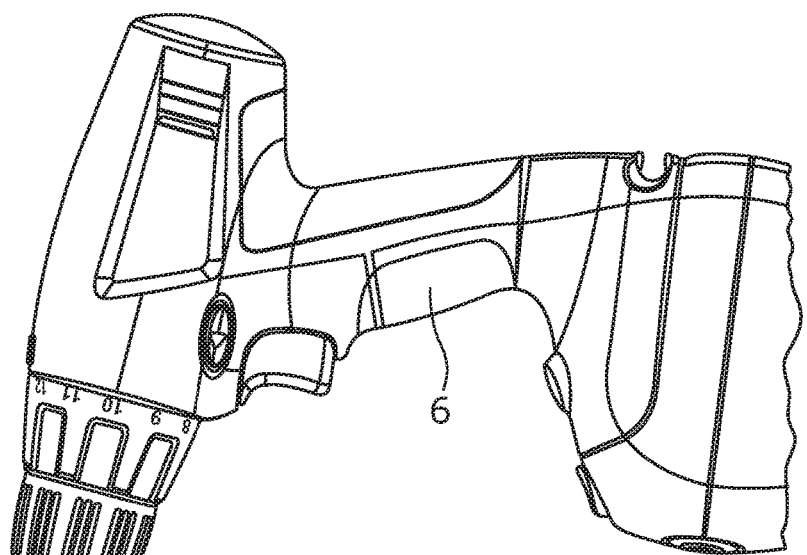
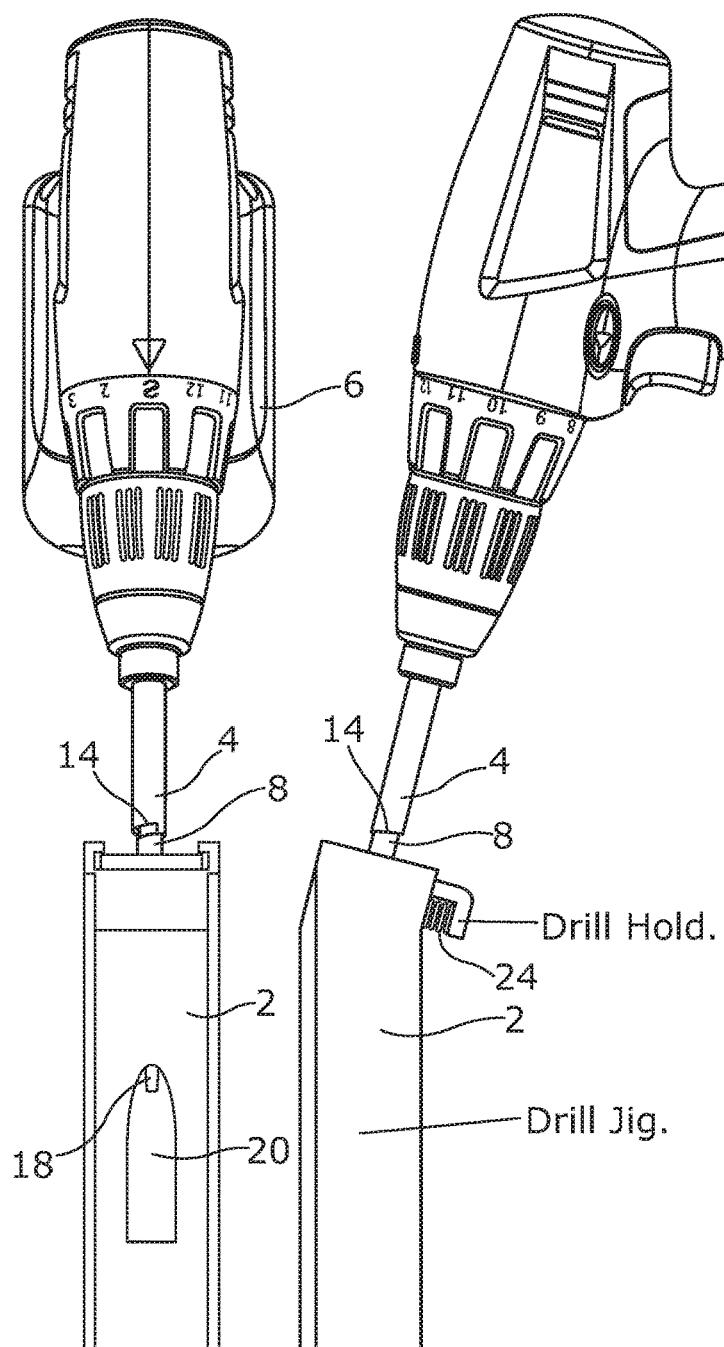

9.5mm Shank

Stepped 9.5-18mm Shank

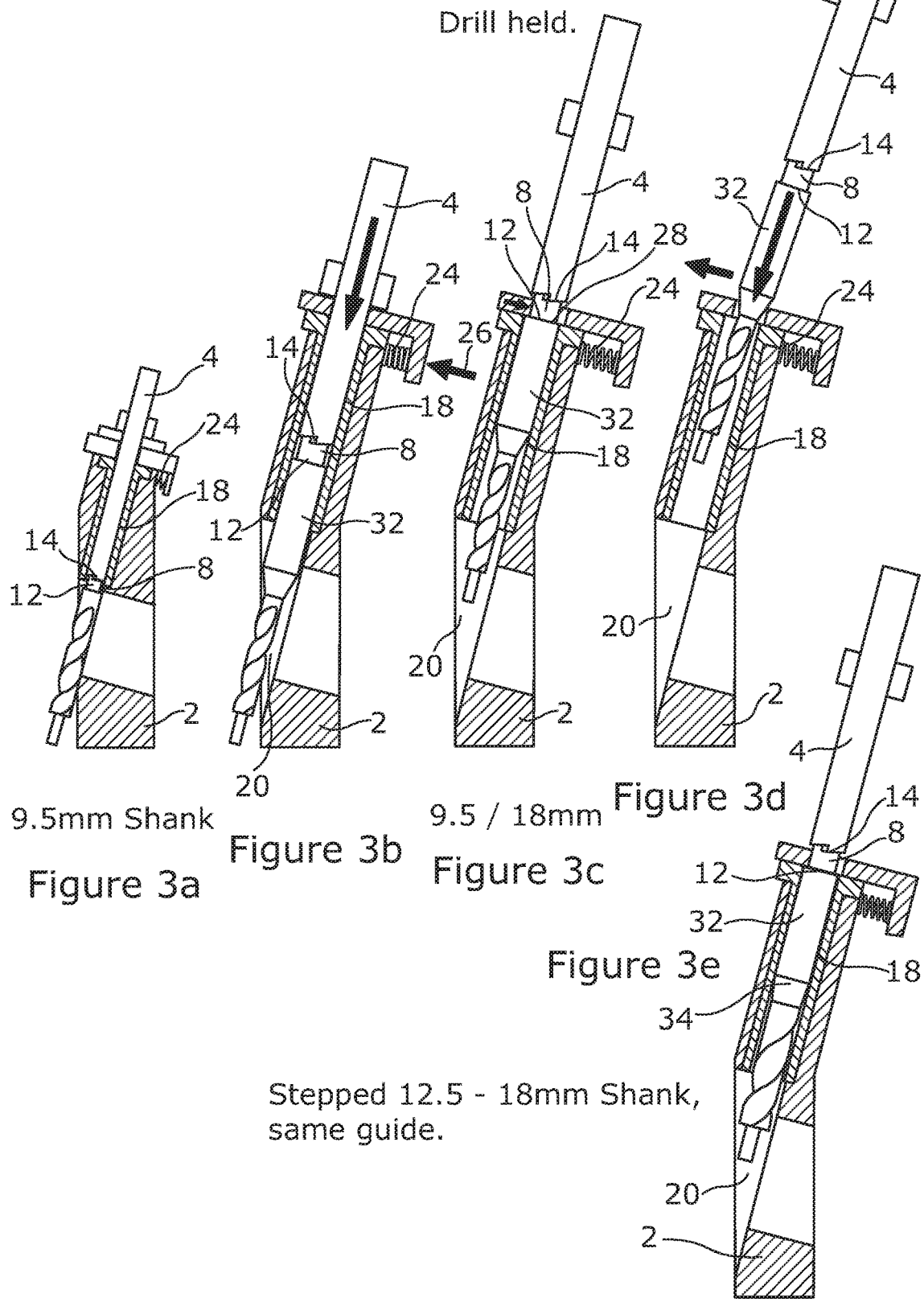

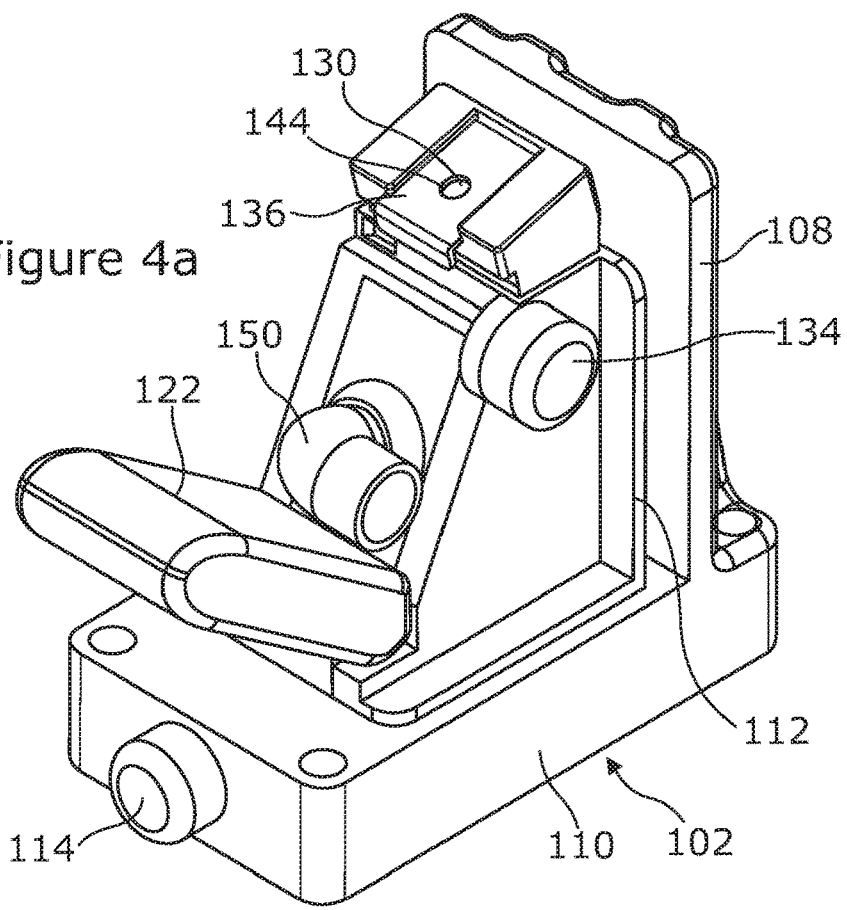
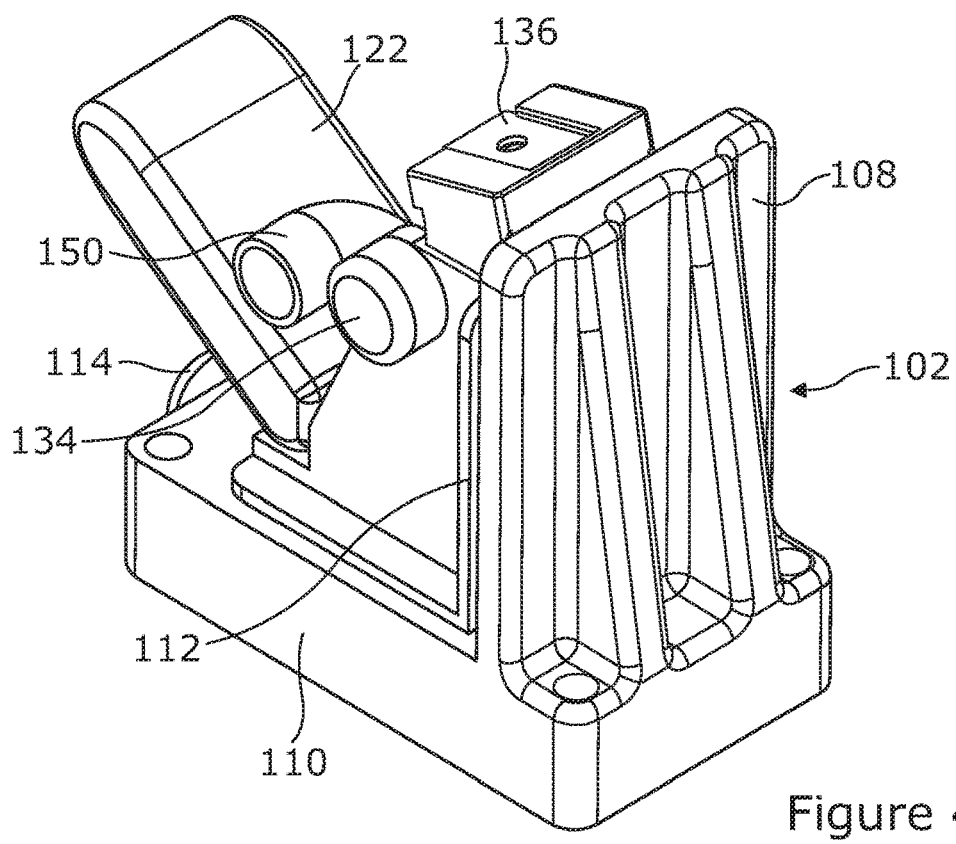

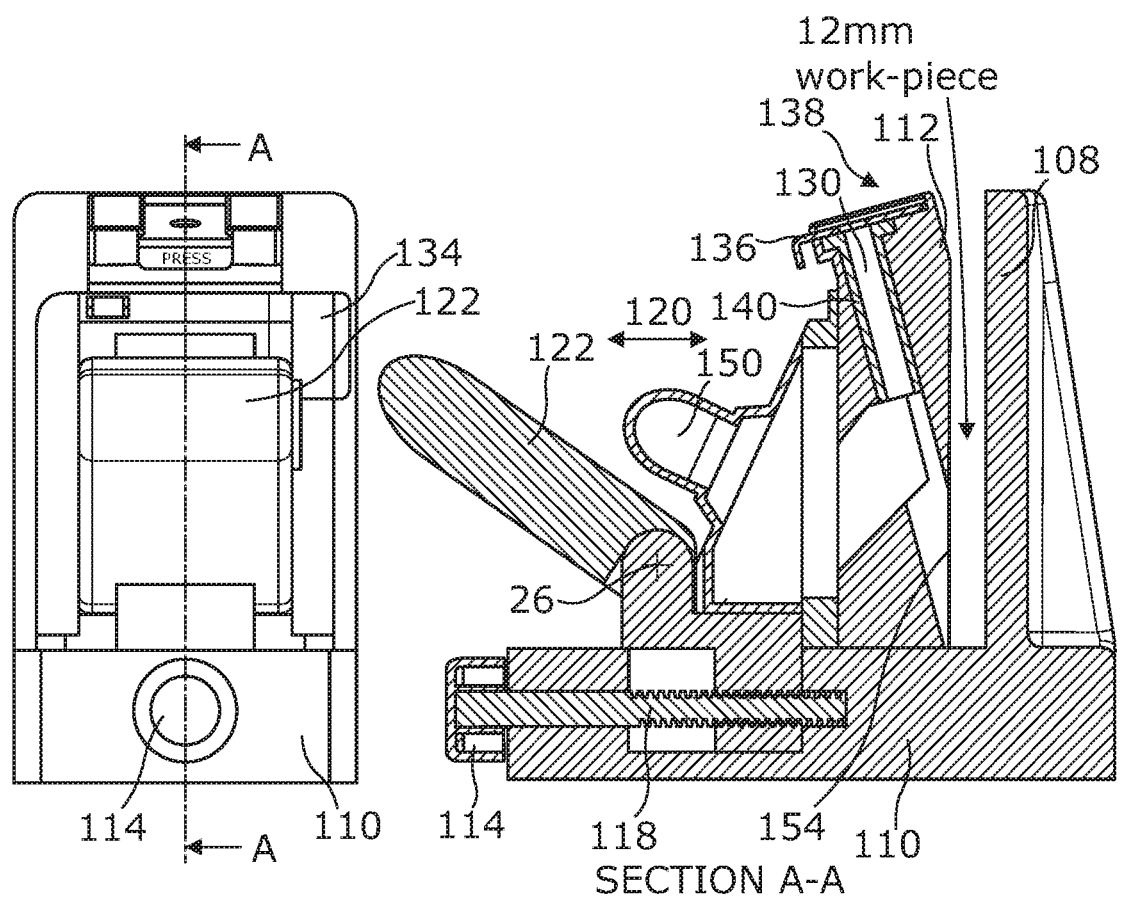
Figure 5b
Figure 5c
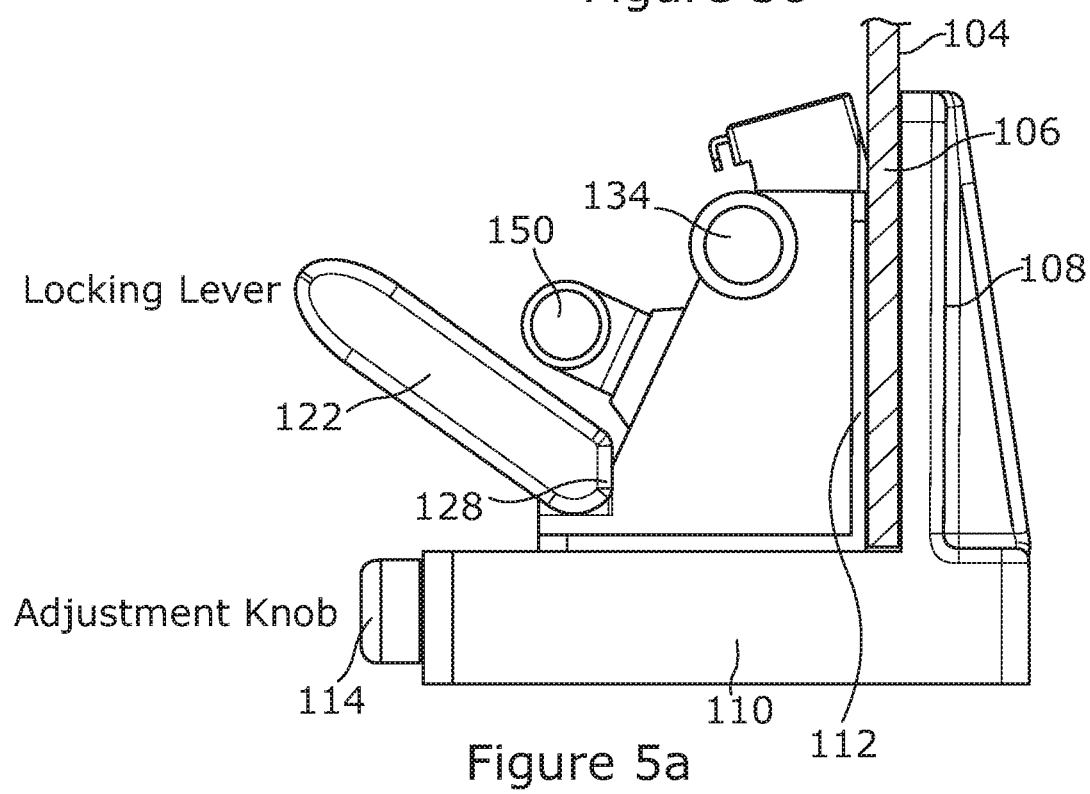
Figure 5a

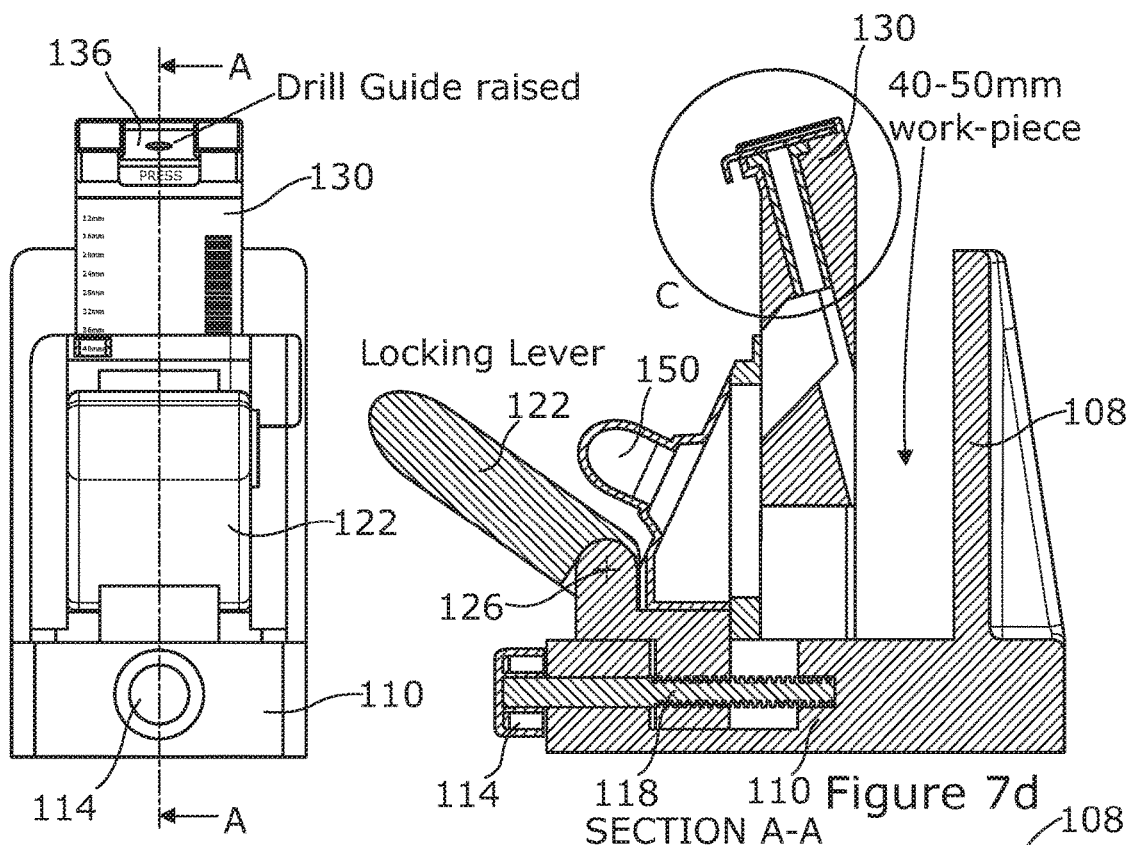
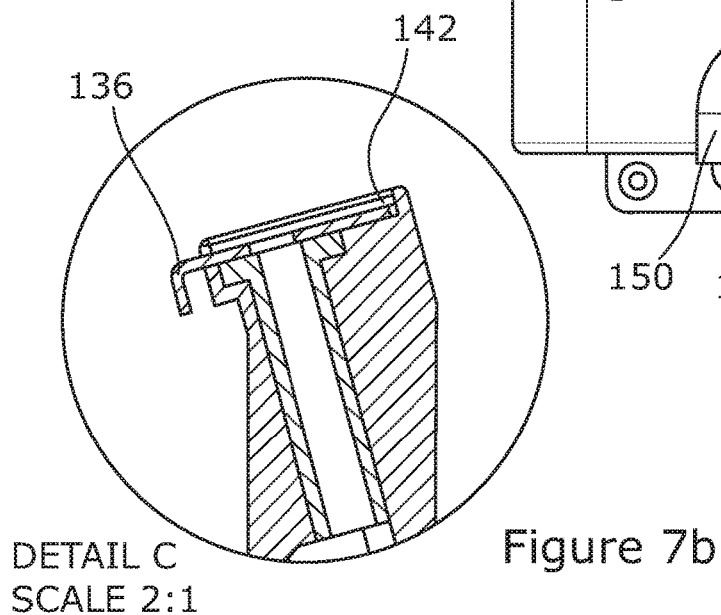
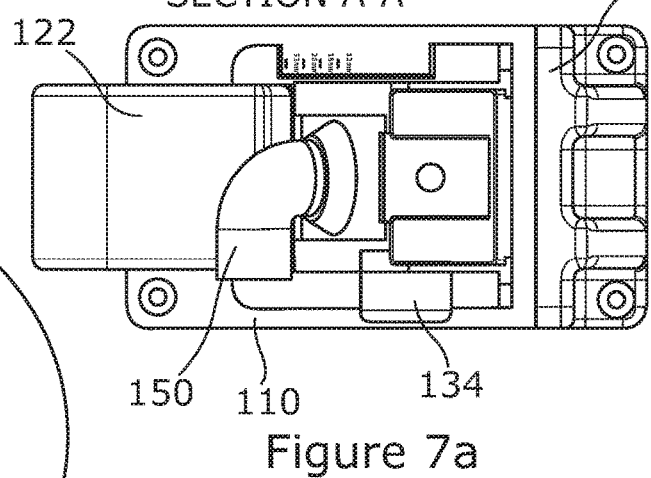

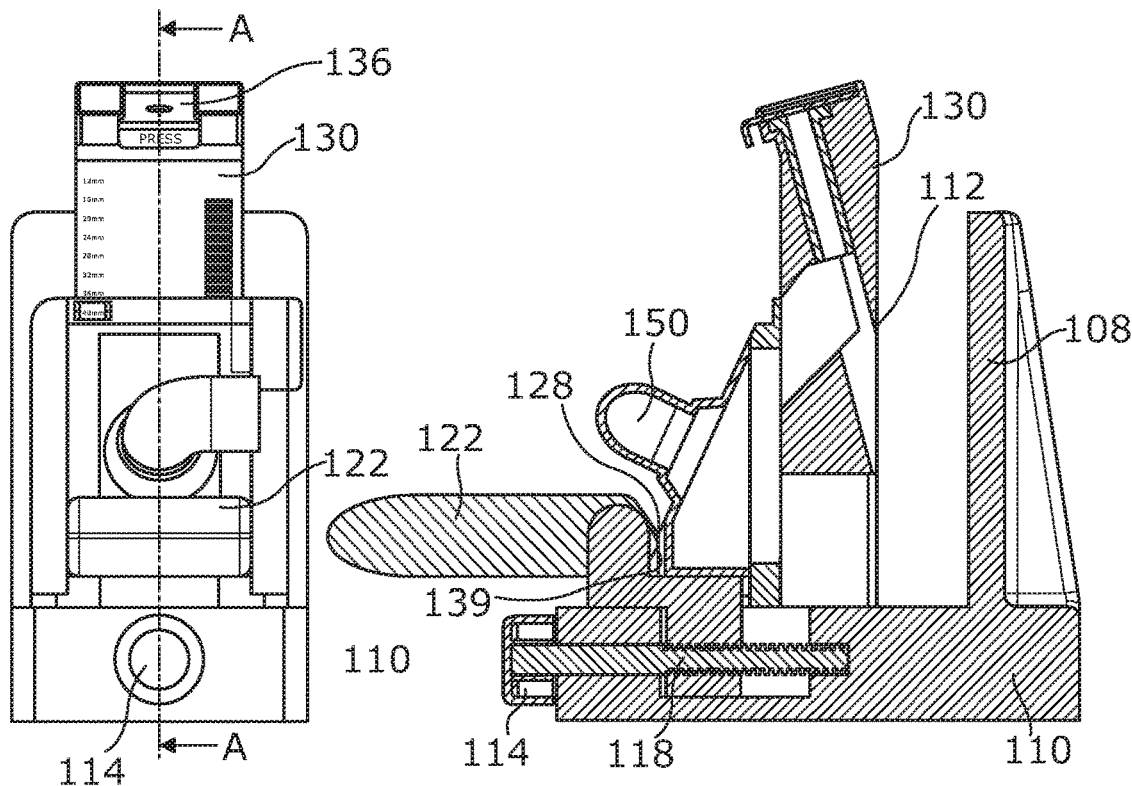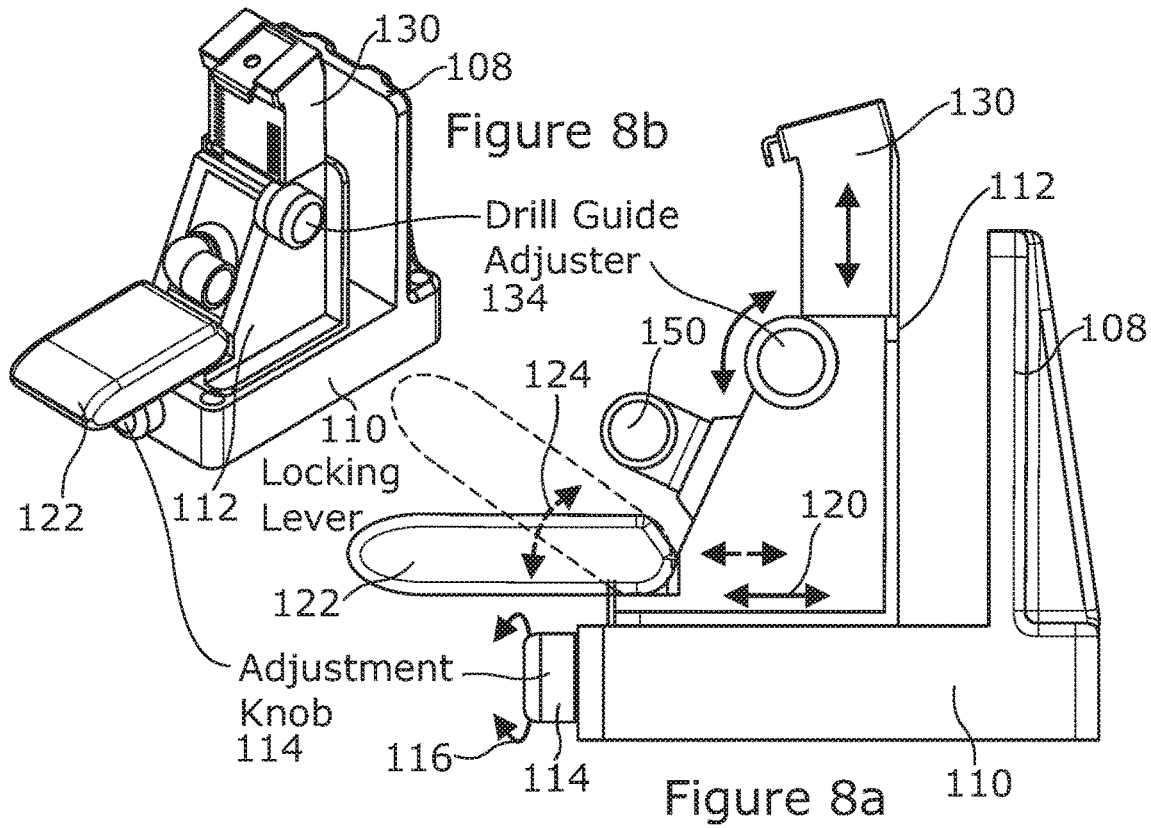

DRILL BIT HOLDING ASSEMBLY FOR JIG AND JIG APPARATUS INCLUDING THE SAME

The invention to which this application relates is apparatus for use with a power tool apparatus of the type which can be used to form holes in a workpiece and in particular jig apparatus which can be used in conjunction with the power tool to guide the same in use. The holes which are formed may be in particular, although not necessarily exclusively, holes of the type which are known as pocket holes.

The formation of holes in workpieces such as planks of wood, can be done freehand in that the user holds the drill power tool and as the drill bit is rotated forms the hole into the workpiece, with the angle of the hole defined directly by the user holding the drill at a particular orientation. An alternative is to use the drill in conjunction with a jig, in which the jig is secured position on a worktop and the jig includes means to locate the workpiece therewith and a guide which is followed by the drill bit so as to introduce the drill bit into the workpiece in the required orientation. The main advantage of this is that the hole is provided at the required angle with respect to the workpiece and the hole can be formed repeatedly in the same manner in successive workpieces.

However a problem with many, if not all of these forms of jig is that the jig requires a particular number of method steps to be performed and in particular after each hole is drilled, the power tool and drill bit have to be completely withdrawn from the jig and then set down to one side as the workpiece is removed and a new workpiece positioned in the jig and then clamped in position. Only then can the drill and drill bit be picked up, the drill bit placed into the drill guide and power then applied to rotate the drill bit as it is advanced into the new workpiece to form the hole therein. When one considers that these method steps may need to be performed a number of times for any one task or project to be competed it will be appreciated that the use of the jig can lead to significant extra time being required. In one embodiment the hole which is formed is a pocket hole which is a two stage hole with a first, or leading narrower hole and a second wider hole to form a sub-surface "pocket" for receipt of the screw head therein. This form of hole is formed using a pocket hole drill bit which has stepped portions. The drill is normally advanced into the workpiece at an acute angle of 10-20 degrees to vertical. Pocket holes are a type of hole which is formed for the reception of a screw to form a joint between two workpieces, typically formed of wood. The holes are typically formed by drilling into the workpiece adjacent the location at which the joint is to be formed. The hole is formed inwardly from the surface of the workpiece such that in one drilling operation there is formed a sub-surface pocket for the screw head, a shoulder for the screw head to bear on and a narrower blind pilot hole to guide a self-cutting screw through the edge of the piece of wood to join that workpiece to another workpiece and hence form the joint between the edges of the respective workpieces.

The formation of these holes is normally done using a drill and a jig for the drill bit which has a tubular steel drill guide which is clamped to the workpiece to guide the stepped drill bit into the wood at an acute angle in order to form the hole to a suitable depth. A key advantage of pocket hole fixing is that even if the joint is also to be glued, the joint which is formed is relatively solid as soon as the screw is tightened and hence there is no need for further clamping or to wait for adhesives to cure. However the conventional apparatus can be time consuming to fit and requires a number of different components to be used in conjunction. Typically the use of the apparatus including the jig requires a particular number of method steps to be performed and in particular after each hole is drilled, the power tool and bit have to be completely withdrawn from the jig and then set down to one side as the wood is repositioned and clamped.

An aim of the present invention is to provide jig apparatus in a form which allows holes to be formed in the workpiece and to shorten the method steps which are required to be performed during the use of the jig and the power tool thereby allowing the drilling procedure to be shortened whilst maintaining the safety of the use of the apparatus and accuracy of the drill hole which is formed in each workpiece. A further aim of the present invention is to provide apparatus in a form which allows holes and, in particular, pocket holes to be formed in the workpiece which are to be joined together and to allow the apparatus to be provided as a power tool apparatus.

In a first aspect of the invention there is a a jig apparatus for use with a drill and drill bit to form a hole in a workpiece with which said jig apparatus is located, said jig apparatus guiding the movement of the drill bit with respect to the workpiece into the workpiece to form the hole and wherein said jig apparatus includes a drill hold assembly which, when engaged allows the drill bit to be maintained in a withdrawn location with the jig whilst the jig apparatus is located to form the said hole.

There is therefore provided jig apparatus for use with a drill and drill bit to form a hole, said jig apparatus, when located with a worktop, supporting a workpiece in which the hole is to be drilled in order to guide the movement of the drill bit with respect to the workpiece in a linear direction into the workpiece to form the hole and wherein said jig apparatus includes a drill hold assembly which allows the drill bit to be maintained in location with the jig in a position in which the same can be used to form the said hole.

In one embodiment the drill hold assembly is provided as an integral part of the drill guide of the jig apparatus.

In one embodiment the jig apparatus is of a type for use in the formation of a pocket hole in a workpiece.

In one embodiment the drill bit is a stepped drill which has at least two different hole forming portions located therealong. In one embodiment it is the wider portion of the drill bit which bears on the drill guide of the jig.

In one embodiment the drill hold assembly includes a movable block which, in one embodiment, is acted on by a resilient means and which engages with a slot around the drill bit to support the drill and drill bit above the workpiece until the drill hold assembly is released.

In one embodiment the drill hold assembly is automatically engaged when the drill bit and drill apparatus is raised from the workpiece after the hole has been formed in the same.

In a further aspect of the invention there is provided a jig incorporating a drill hold assembly as herein described.

In a yet further aspect of the invention there is provided a drill bit with a slot formed around a portion thereof, said slot including a helical upper edge.

In one embodiment the lower edge of the slot is angularly offset from the said upper edge.

In one embodiment the said slot is located between the end attached to the drill and a fluted section of the drill bit.

In a further aspect of the invention there is provided a drill hold assembly for use with a drill bit, said drill hold assembly including an engaging block which is selectively moveable between a released position to allow sliding movement of the drill bit with respect thereto and an engaged position in which the drill bit is held in a fixed position or within a predefined range of movement with respect to the engaging block to thereby maintain the drill bit in location with the drill hold assembly.

In a further aspect of the invention there is a jig apparatus for use with a drill and drill bit to form a hole, said jig apparatus, when located with a worktop, supports a workpiece in which the hole is to be drilled in order to guide the movement of the drill bit with respect to the workpiece in a linear direction into the workpiece to form the hole and wherein said clamping means includes a base with a rear jaw, said base fitted to the worktop and also having movably mounted therewith a front jaw assembly, drill guide and drill hold assembly.

In one embodiment an adjusting means is provided to allow the user adjustment of the position of the front jaw with respect to the fixed rear jaw. Typically the adjustment is performed in order to allow the gap between the jaws to be selected to suit the particular workpiece which is to be supported by the jig.

In one embodiment the apparatus is provided to form a pocket hole in the workpiece and the drill bit is a stepped drill which has at least two different hole forming portions located therealong. In one embodiment it is the wider portion of the drill bit which bears on the drill guide of the jig.

In one embodiment the clamping means allow the apparatus to be clamped with respect to the workpiece such that the hole is formed with a longitudinal axis in a range of between 10 and 25°, more preferably 12 to 18° to the surface of the workpiece into which the drill is advanced to form the hole.

In one embodiment when the workpiece is clamped in position a lever is moved to lock the jaws in the clamping position. In one embodiment the lever is cam lever which acts on biasing means in the form of a spring.

In one embodiment the drill hold assembly includes a movable block which is acted on by a resilient means and which engages with a slot around the drill bit to support the drill and drill bit above the workpiece until the drill hold assembly is released.

In one embodiment the drill hold assembly is automatically engaged when the drill bit and drill apparatus is raised from the workpiece after the hole has been formed in the same.

In one embodiment the jig includes a dust extraction passage to allow dust and debris created during the drilling operation to be removed from the jig.

In a further aspect of the invention there is provided a method of forming a hole in a workpiece, said method comprising using a drill including a drill bit and a motor for selectively providing a driving force to the drill bit, attaching a jig to a support surface, clamping a workpiece between first and second jaws of the jig by adjusting at least one of the jaws to move the same into a clamping position, advancing the drill bit into a guide and applying the driving force to rotate the drill bit as it is introduced into the workpiece to form the hole therein at a predefined angle, removing the drill bit from the hole and wherein once removed from the hole engaging the drill bit with a drill hold assembly to retain the drill bit in a fixed position with respect to the jig.

In one embodiment the method includes using a drill bit of a form so as to form a pocket hole in the workpiece.

In one embodiment the method includes the step of operating a locking means to lock at least one movable jaw in the clamping position.

Figures 2A, 2B:
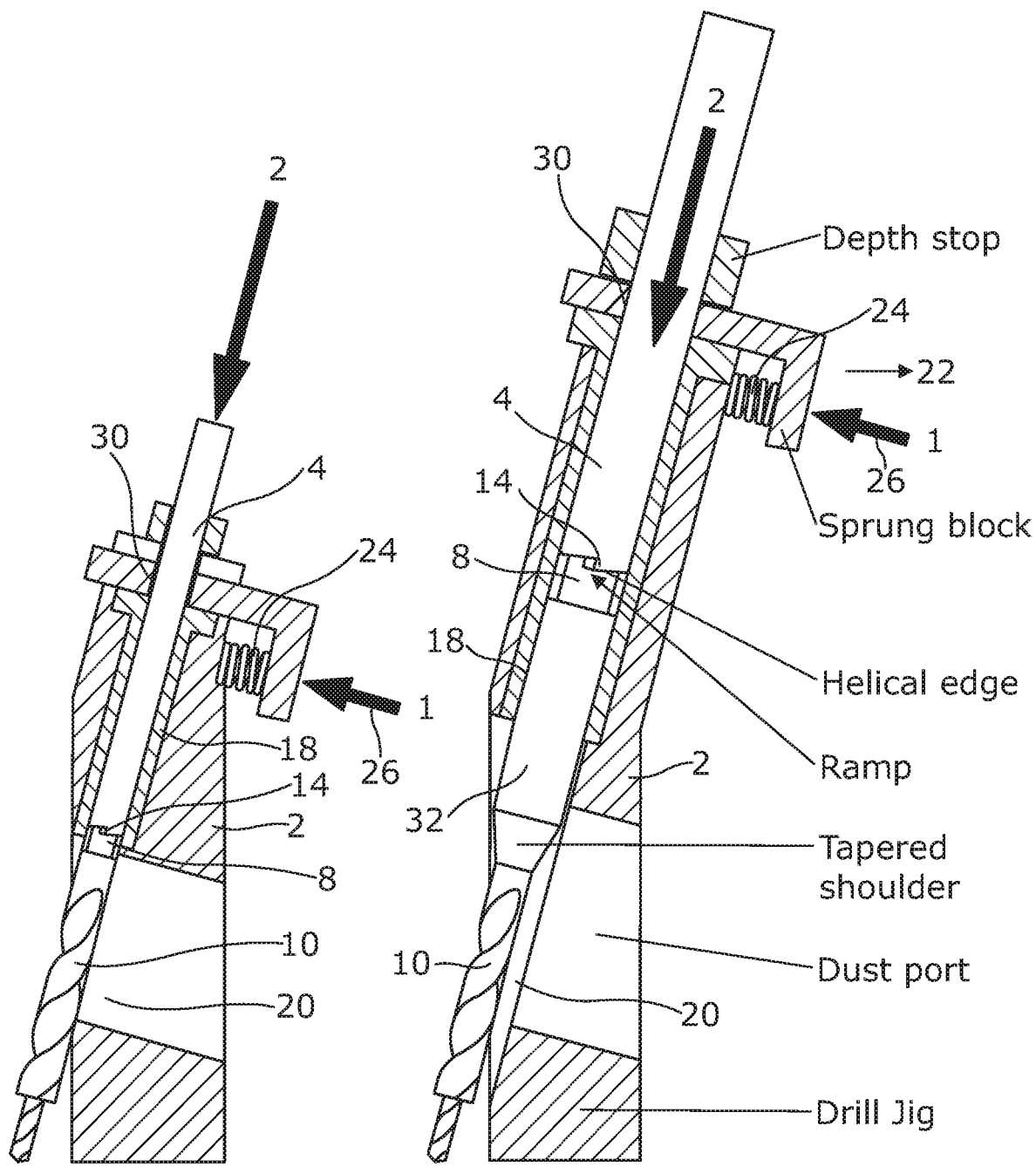

Specific embodiments of the invention are now described with reference to the accompanying drawings; wherein FIGS. 1a-l illustrate one embodiment of a drill hold assembly and the stages of use of the same;

FIGS. 2a and b illustrate the components of a drill hold assembly in accordance with one embodiment;

FIGS. 3a-e illustrate a further embodiment of the drill hold assembly.

Figure 6:
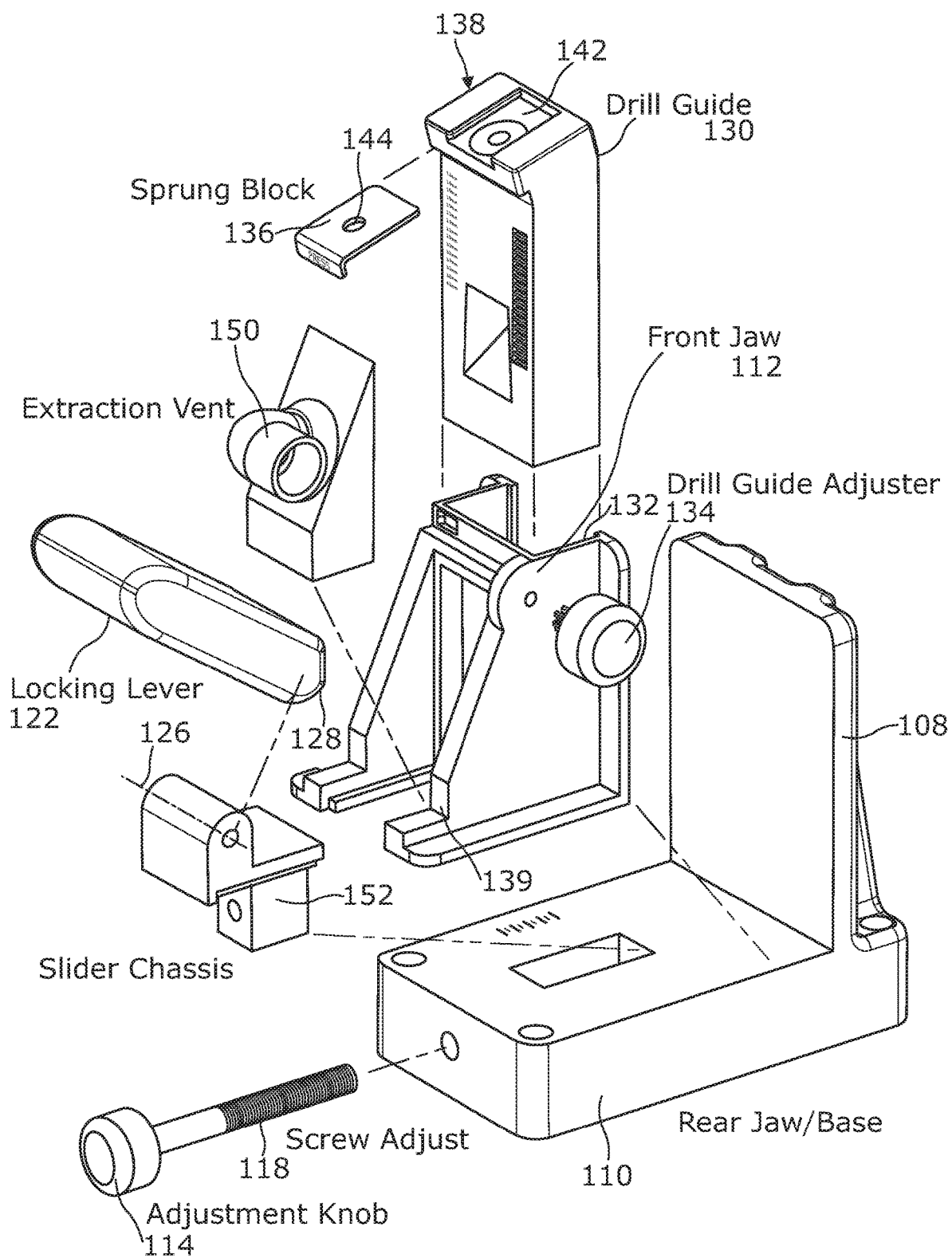

FIGS. 4a and b illustrate perspective views of the jig of the apparatus in accordance with a further embodiment of the invention;

FIGS. 5a-c illustrate views of the jig of FIGS. 4a and 4b;

FIG. 6 illustrate an exploded diagram of the components of the apparatus in accordance with a further embodiment of the invention in detail;

FIGS. 7a-d illustrate views of the jig apparatus of FIGS. 4a-6 with the drill hold assembly in position; and FIGS. 8a-d illustrate further views of the jig apparatus with the drill hold assembly in position.

Referring to the FIGS. 1-3e, there is illustrated a drill hold assembly 2 which can be integrated into any jig and is of particular utility with respect to a drill jig of the type for use to form a pocket hole using a drill bit 4 attached t a drill 6 which provides a rotating force to the drill bit when powered. The drill hold assembly allows the drill bit 4 and hence drill 6 to be retained in position between drilling operations, thus speeding up the drilling of multiple pocket holes.

This therefore allows the drill 6 and drill bit 4 to stay in the jig apparatus while the workpiece is repositioned or other settings are changed, thereby speeding up the process significantly.

The drill bit 4 includes a shallow square-cut slot 8 around the drill bit shank above the fluted section 10, the lower edge 12 of which is flat, while the upper edge 14 rises in a uniform helix for one revolution around the drill bit 4. Acting on this feature is a sprung block 16 moving across the top of a drill guide 18, formed in the drill hold assembly 2 along which the drill bit is provided to move to reach the interface aperture 20 at which the tip of the drill enters the workpiece located in the jig (not shown) to form the hole in the workpiece. The sprung block 16 is sprung in one direction 22 by the action of spring 24 and is released manually by pushing it in the opposite direction 26 against the spring 24. The sprung block can have either a circular hole or a semi-circular cut-out in its edge which engages the slot 8 around the drill bit 4 when it slides into alignment with the block as shown in FIGS. 1c,d and FIGS. 3c,e.

The purpose of the sprung block 16 is to engage on its lower side 28 with the lower edge of the drill slot 8, acting as a keep for the drill and drill bit to prevent withdrawal of the same upwardly, unless the sprung block is manually released. The upper edge of the hole or profile 30 in the sprung block 16, which may be shaped to match the incline of the helix on the upper side 14 of the drill slot 8, prevents the drill bit from descending through the jig into the wood as long as the drill bit isn't turning in the cutting direction (clockwise). However, as soon as the drill 6 starts and turns clockwise by just one revolution, the sprung block 16 rides the ramp at the end of the helix, hence releasing the drill bit 4 and drill 6 to descend freely to the set depth and form the pocket hole. Once the hole is cut the drill 6 and drill bit 4 is withdrawn until the sprung block 16 engages in the drill slot 8 again, both preventing its complete withdrawal until manually released by the sprung block 16, or allowing its descent by the drill rotation auto-releasing the sprung block 16 from the end of the helix 14.

In another variation shown in FIGS. 2b and 3b-e the step drill bit 4 shank tapers 34 out to a larger diameter 32 above the fluted section 10, giving a larger bearing surface for both the parallel walls of the cylindrical drill guide 18 and the depth of the square-cut slot 8 around the drill bit shank 4. This also allows the narrower cutting end of the step drill to pass the sprung block 16 as shown in FIG. 3d which is then backed-off automatically by the tapered transition 34 to the larger diameter section 32 at the upper end of the drill bit 4.

Referring now to the FIGS. 4-8d there is illustrated the jig apparatus 102 in accordance with a further embodiment of the invention. The apparatus is provided for use to drill a pocket hole in a workpiece 104 which is illustrated clamped in position in FIG. 5a in the form of a piece of wood in this case. The work piece can have a depth at its edge 106 onto which the apparatus is applied, in the range of 12 mm, as shown in FIG. 5a, to 50 mm thick. The jig apparatus includes a fixed jaw 108 which is formed as part of the base 110. The jig 102 also includes a movable jaw 112 which is adjustable with respect to the base via a rotational adjustment knob 114 which, when turned by the user as indicated by arrow 116, moves the jaw 112 linearly as indicated by arrow 120, by way of a threaded adjuster screw 118 acting on the slider chassis 152 mounted on the base 110. When the jaws 108,112 are in the required clamping position a cam lever 122 can be moved to a locking position which is that shown in FIGS. 4a-b, 5a-c, 6a-d and when the jaw 112 is to be moved, the lever 122 is pivotally moved to the position as indicated by arrow 124 about pivot location 126 on the slider chassis 152 which is movable with respect to the base 110, with the cam portion 128 acting on the face 139 to lock the same in position when the lever is in the locking position.

The jig includes a drill guide 130 which is height adjustable with respect to the base 110 and the drill guide is mounted along a track 132 in the front jaw 112 and which can be height adjusted via a rack and pinion arrangement by rotation of the knob 134 to set the optimum depth of the guide with respect to the pocket hole which is to be formed and the thickness of the workpiece in which the same is to be formed.

The drill bit is inserted into the drill guide through the aperture at the end removed from the interface 154 between the drill guide and the workpiece 104 and the drill bit is inserted in the direction of arrow 138. The drill guide is provided with a sleeve 140, typically of steel, and is arranged at the required angle, in this case in the range 12-20 degrees from vertical, and therefore guides the linear path of the drill bit as it is rotated and enters into the workpiece to form the pocket hole therein.

The sprung block 136 is part of the drill hold assembly which allows the drill and drill bit to be retained in location with the jig while the workpiece is removed and a new workpiece replaced and/or other settings are changed, thereby speeding up the drill process significantly. The drill hold function is achieved in conjunction with a shallow square cut slot located on the drill bit so as to be around the drill bit shank when it is in the drill guide and which is located above the fluted section of the drill bit, the lower edge of the slot is flat and an upper edge rises in a uniform helix for one revolution around the drill bit. The sprung block 136 is movable across the top of the drill guide 130 in guide 142 to engage with the slot formed in the drill bit by, in this case, linear movement. The sprung block is sprung in one direction and is released manually by pushing it in the opposite direction against the spring.

The sprung block 136 therefore engages on its lower side with the lower edge of the slot in the drill bit, acting as a keep for the drill to prevent withdrawal of the drill bit from the drill guide beyond a certain point unless the sprung block is manually released. The upper edge of the hole in the sprung block, which may be shaped to match the incline of the helix on the upper side of the drill slot, prevents the drill from descending through the jig into the wood as long as it isn't turning in the cutting direction. However, as soon as the drill starts and the drill bit is rotated so that it turns clockwise by one revolution, then the spring block rides a ramp at the end of the helix, hence releasing the drill to descend freely to the set depth and complete the pocket hole formation in the new workpiece. Once that hole is cut, the drill and drill bit are withdrawn until the sprung block again engages in the drill slot, both preventing the further removal of the drill until the sprung block is manually released and/or allowing is descent when the drill rotation releases the spring block from the end of the helix as described above.

In another embodiment the step drill bit shank tapers out to a larger diameter above the fluted section hence giving a larger bearing surface for both the parallel walls of the drill guide and the depth of the slot around the drill bitshank. This also allows the narrower cutting end of the step drill to pass the sprung block 136 to back it off automatically to the descending tapered transition to the larger diameter shank at the upper end of the drill bit.

A dust extraction vent 150 is provided to allow the removal therethrough of dust and debris which is created at the interface 154 between the drill guide 130 and the workpiece 106.

The invention claimed is:

1. A jig apparatus for use with a drill and drill bit to form a hole in a workpiece with which said jig apparatus is located, said jig apparatus guiding the movement of the drill bit with respect to the workpiece into the workpiece to form the hole and said jig apparatus includes a drill hold assembly which, when disengaged allows said drill and drill bit to be linearly movable with respect to the jig apparatus to move into the workpiece to form said hole and wherein when said drill hold assembly is engaged allows the said drill and drill bit to be maintained in a withdrawn location with the jig whilst the jig apparatus is located to form the said hole by moving said workpiece with respect to said jig apparatus and said drill and drill bit are supported by, and retained in said withdrawn location with said jig apparatus by the said drill hold assembly until the same is disengaged wherein the drill hold assembly includes a movable block which engages with a slot formed around the drill bit to serve to support the drill and drill bit in the said withdrawn location until the drill hold assembly is released.

2. Apparatus according to claim 1 wherein the drill hold assembly is provided as an integral part of a drill guide of the jig apparatus.

3. Apparatus according to claim 1 wherein the jig apparatus is for use in the formation of a pocket hole in a workpiece and the drill bit is a stepped drill which has at least two different hole forming portions located therealong.

4. Apparatus according to claim 1 wherein a widest portion of the drill bit bears on the drill guide.

5. Apparatus according to claim 1 wherein the said block is acted upon by a biasing means.

6. Apparatus according to claim 5 wherein the drill hold assembly is automatically engaged when the drill bit and drill is raised from the workpiece after a hole has been formed in the same by engagement of the slot in the drill bit and said block.

7. A jig apparatus according to claim 1 wherein said jig apparatus includes a base with a rear jaw, said base fitted to the worktop and also having movably mounted therewith a front jaw assembly and adjusting means are provided to allow the user adjustment of the relative positions of the front and rear jaws to allow the gap between the jaws to be selected to clamp the particular workpiece which is to be supported by the jig.

8. A jig apparatus according to claim 7 wherein when the workpiece is clamped in position a lever is provided to lock the jaws in the clamping position.

9. A jig apparatus according to claim 8 wherein the lever has a cam which acts on biasing means in the form of a spring.

10. A jig apparatus according to claim 7 wherein the jig includes a dust extraction passage to allow dust and debris created during the drilling operation to be removed from the jig.

11. Apparatus according to claim 1 wherein said jig apparatus is adapted to be movably inserted into a base with a rear jaw, the base fitted to the worktop and also having movably mounted therewith a front jaw assembly and adjusting means are provided to allow the user adjustment of the relative positions of the front and rear jaws to allow a gap between the jaws to be selected to clamp a particular workpiece which is to be supported by the jig.

12. Apparatus according to claim 1, wherein said jig apparatus defines a surface adapted to be clamped flush against a flat workpiece.

13. Apparatus according to claim 1 wherein said jig apparatus includes a dust extraction passage to allow dust and debris created during the drilling operation to be removed from the jig.

14. Apparatus according to claim 1 wherein said jig apparatus is adapted to be movably inserted into a drill hold assembly.

* * * * *